United States Patent
Ramakrishna et al.

(10) Patent No.: US 9,450,723 B2
(45) Date of Patent: Sep. 20, 2016

(54) CHANNEL ESTIMATION FOR DATA TRANSMISSION PARAMETER DETERMINATION IN SYSTEMS EMPLOYING AN ARRAY-OF-SUBARRAYS TRANSCEIVER ARCHITECTURE

(71) Applicant: Samsung Electronics Co., Ltd., Suwon-si, Gyeonggi-do (KR)

(72) Inventors: Sudhir Ramakrishna, Plano, TX (US); Jaspreet Singh, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 48 days.

(21) Appl. No.: 14/473,875

(22) Filed: Aug. 29, 2014

(65) Prior Publication Data
US 2015/0124738 A1  May 7, 2015

Related U.S. Application Data

(60) Provisional application No. 61/899,005, filed on Nov. 1, 2013.

(51) Int. Cl.
*H04W 4/00* (2009.01)
*H04L 5/00* (2006.01)
(Continued)

(52) U.S. Cl.
CPC ............ *H04L 5/0048* (2013.01); *H04B 7/0404* (2013.01); *H04B 7/0456* (2013.01); *H04B 7/0697* (2013.01); *H04L 25/0204* (2013.01); *H04L 25/0224* (2013.01); *H04L 2025/03414* (2013.01); *H04L 2025/03426* (2013.01); *H04W 72/046* (2013.01); *H04W 72/0413* (2013.01)

(58) Field of Classification Search
CPC .......................... H04B 7/0639; H04B 7/0478
See application file for complete search history.

(56) References Cited

U.S. PATENT DOCUMENTS

| | | | |
|---|---|---|---|
| 2004/0127230 A1* | 7/2004 | Bevan | H04W 64/00 455/456.5 |
| 2010/0150266 A1* | 6/2010 | Mondal | H04B 7/0417 375/296 |

FOREIGN PATENT DOCUMENTS

EP       2141825 A1 *  1/2010  .......... H04B 7/0452

OTHER PUBLICATIONS

Orfanidis, S.; "Electromagnetic Waves and Antennas"; ECE Department, Rutgers University, 94 Brett Road, Piscataway, NJ 08854-8058; printed from www.ece.rutgers.edu/~oirfanidi/ewa; 2008; 12 pages.
3GPP TS 36.300 Version 8.7.0, Release 8; Evolved Universal Terrestrial Radio Access Network (EUTRAN) Overall Description—Stage 2; ETSI TS 136 300; V8.7.0; (Jan. 2009); printed from www.etsi.org/deliver/etsi_ts/136300_136399/136300/08.07.00_60/ts_13600v080700p.pdf; 148 pages.

(Continued)

*Primary Examiner* — Maharishi Khirodhar

(57) ABSTRACT

A method and an apparatus for channel estimation. The method includes identifying a set of preferred BS receive beams for each of a plurality of BS antenna SAs based on periodic pilot transmissions from a UE transmitted using predefined UE transmit beams. The method also includes transmitting a request for the UE to transmit pilot signals for the set of preferred BS receive beams. The method further includes receiving the pilot signals using the set of preferred BS receive beams. The method also includes performing channel estimation and determining the data transmission parameters based on the received pilot signals, the data transmission parameters including at least one receive beam at each UE antenna SA to be used for data reception. Additionally, the method includes transmitting, to the UE, information for identifying the at least one receive beam at each UE antenna SA to be used for data reception.

20 Claims, 7 Drawing Sheets

(51) Int. Cl.
  *H04L 25/02* (2006.01)
  *H04B 7/04* (2006.01)
  *H04B 7/06* (2006.01)
  *H04W 72/04* (2009.01)
  *H04L 25/03* (2006.01)

(56) References Cited

OTHER PUBLICATIONS

IEEE 802.16m-2011 (Amendment to IEEE Std 802.16/2009); Part 16: Air Interface for Broadband Wireless Access Systems, Amendment 3; Advanced Air Interface; IEEE; May 6, 2011; 1106 pages.

* cited by examiner

CHANNEL ESTIMATION FOR DATA TRANSMISSION PARAMETER DETERMINATION IN SYSTEMS EMPLOYING AN ARRAY-OF-SUBARRAYS TRANSCEIVER ARCHITECTURE

CROSS-REFERENCE TO RELATED APPLICATION(S) AND CLAIM OF PRIORITY

This application claims priority under 35 U.S.C. §119(e) to U.S. Provisional Patent Application No. 61/899,005 filed on Nov. 1, 2013 and entitled "METHODS TO ENABLE CHANNEL ESTIMATION FOR DATA TRANSMISSION PARAMETER DETERMINATION IN OFDM SYSTEMS EMPLOYING THE ARRAY-OF-SUBARRAYS TRANSCEIVER ARCHITECTURE." The above-identified provisional patent application is hereby incorporated by reference in its entirety.

TECHNICAL FIELD

This disclosure relates generally to data transmission parameter determination in wireless communication systems. More specifically, this disclosure relates to channel estimation for data transmission parameter determination in systems employing an array-of-subarrays transceiver architecture.

BACKGROUND

With digital communications in a multipath environment and orthogonal frequency division multiplexing (OFDM) encoding techniques, an array-of-subarrays (AoSs) architecture has been adopted in transmitters and receivers. For example, multiple antennas are included in a sub-array and each transmitter/receiver includes an array of such sub-arrays. Such AoSs architecture may be used, in multiple-input multiple-output (MIMO) communication systems as well as millimeter-wave broadband (MMB) communication systems.

SUMMARY

Embodiments of the present disclosure provide channel estimation for data transmission parameter determination in systems employing an array-of-subarrays transceiver architecture.

In one embodiment, a method for channel estimation is provided. The method includes identifying a set of preferred base station (BS) receive beams for each of a plurality of BS antenna sub-arrays (SAs) based on periodic pilot transmissions from a user equipment (UE) transmitted using pre-defined UE transmit beams. The method also includes transmitting a request for the UE to transmit pilot signals for the set of preferred BS receive beams. The method further includes receiving the pilot signals using the set of preferred BS receive beams. The method also includes performing channel estimation and determining the data transmission parameters based on the received pilot signals, the data transmission parameters including at least one receive beam at each UE antenna SA to be used for data reception. Additionally, the method includes transmitting, to the UE, information for identifying the at least one receive beam at each UE antenna SA to be used for data reception.

In another exemplary embodiment, an apparatus for channel estimation is provided. The apparatus comprises a transceiver comprising a plurality of BS antenna SAs and a controller. The controller is configured to identify a set of preferred BS receive beams for each of the plurality of BS antenna SAs based on periodic pilot transmissions from a UE transmitted using predefined UE transmit beams. The transceiver is configured to transmit a request for the UE to transmit pilot signals for the set of preferred BS receive beams and receive the pilot signals using the set of preferred BS receive beams. The controller is configured to perform channel estimation and determine the data transmission parameters based on the received pilot signals. The data transmission parameters including at least one receive beam at each UE antenna SA to be used for data reception. The transceiver is configured to transmit information to the UE for identifying the at least one receive beam at each UE antenna SA to be used for data reception.

In yet another exemplary embodiment, an apparatus in a UE is provided. The apparatus includes a transceiver comprising a plurality of UE antenna SAs and a controller. The transceiver is configured to receive pilot signals from a BS transmitted using predefined BS transmit beams. The controller is configured to identify a set of strongest angle of arrival (AoA) directions based on the received pilot signals; receive, via the transceiver, a request to use N number of beams for data transmission parameter determination; and determine a set of N UE transmit beams along N of the set of strongest AoA directions. The transceiver is further configured to transmit pilot signals via each of the N UE transmit beams from each SA, receive information for identifying at least one receive beam at each UE antenna SA to use for data reception, and receive data from the BS using the at least one receive beam at each UE antenna SA.

In another exemplary embodiment, an apparatus in a UE is provided. The apparatus includes a transceiver comprising a plurality of UE antenna SAs. The transceiver is configured to transmit first pilot signals to a BS using predefined UE transmit beams, receive a request including an indication of N number of UE transmit beam indices for transmission of second pilot signals, and transmit the second pilot signals using N UE transmit beams corresponding to the N number of UE transmit beam indices from each SA. The transceiver is further configured to receive information for identifying at least one receive beam at each UE antenna SA to use for data reception and receive data from the BS using the at least one receive beam at each UE antenna SA.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated into the present disclosure as if fully set forth herein:

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", V8.7.0, December 2008.

IEEE Std 802.16m-2011 (Amendment to IEEE Std 802.16-2009), Part 16: Air Interface for Broadband Wireless Access Systems, Amendment 3: Advanced Air Interface, March 2011.

Figure 1:
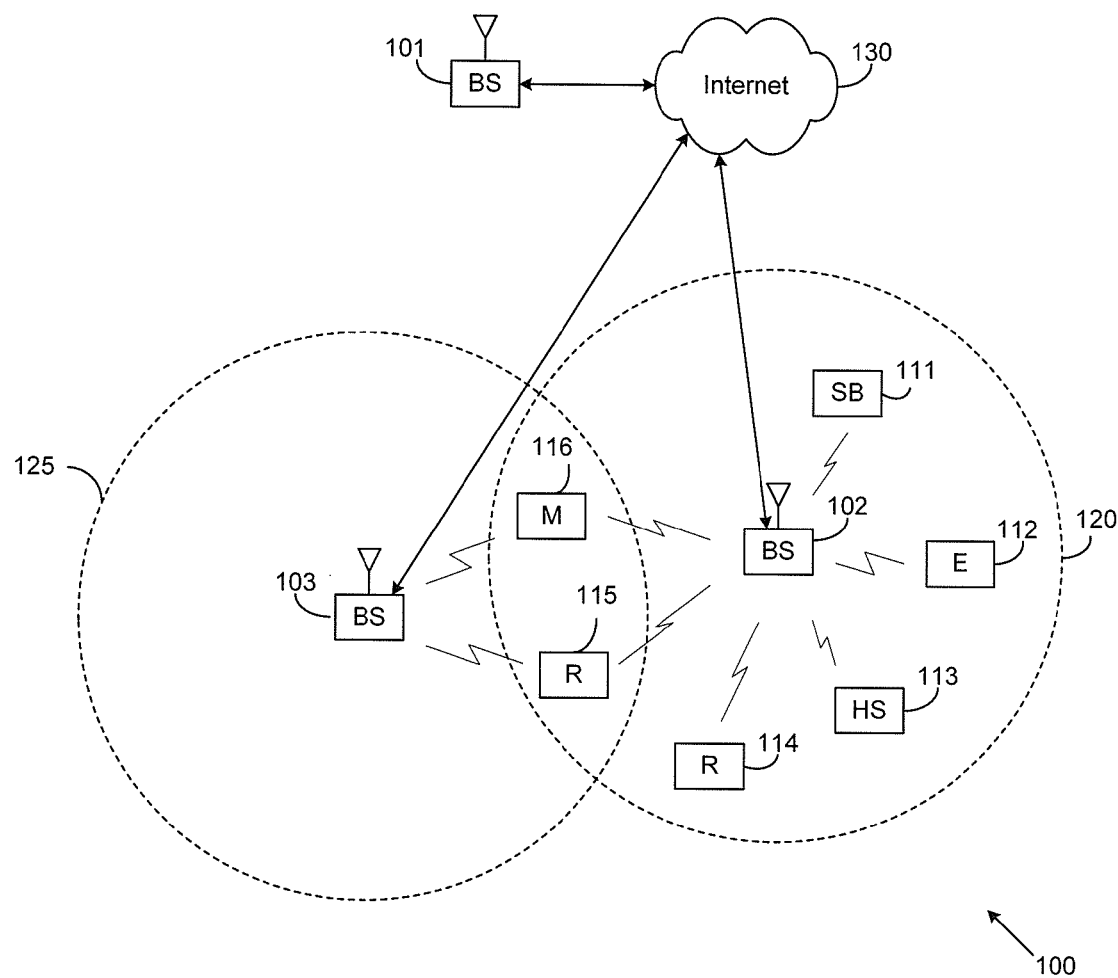
FIG. 1 illustrates an example wireless system which transmits according to illustrative embodiments of this disclosure.
Figure 2:
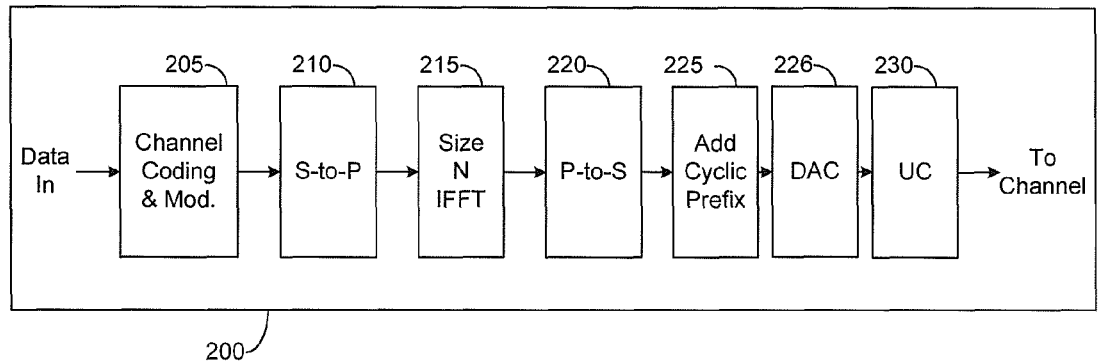
FIG. 2 illustrates a high-level diagram of an orthogonal frequency division multiple access transmit path according to illustrative embodiments of this disclosure.
Figure 3:
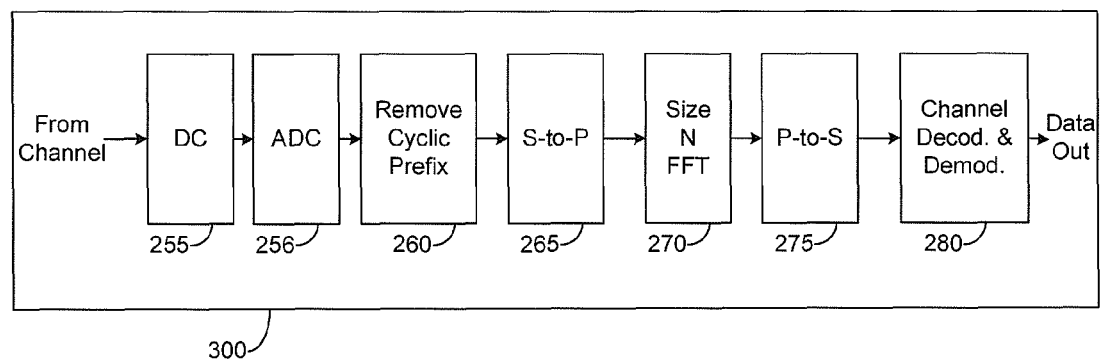
FIG. 3 illustrates a high-level diagram of an orthogonal frequency division multiple access receive path according to illustrative embodiments of this disclosure.

FIGS. 1-3 below describe various embodiments implemented in wireless communications systems and with the use of O1-DM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to Internet 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via Internet 130. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a user equipment (e.g. user equipment 116 of FIG. 1). In other examples, for uplink communication, the receive path circuitry 300 may be implemented in a base station (e.g. base station 102 of FIG. 1) or a relay station, and the transmit path circuitry 200 may be implemented in a user equipment (e.g. user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix (CP) block 225, a digital-to-analog conversion (DAC) block 226, and up-converter (UC) 230. Receive path circuitry 300 comprises down-converter (DC) 255, an analog-to-digital conversion (ADC) block 256, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. DAC block 226 converts the digital signal to an analog signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, ADC block 256 converts the received analog signal to a digital signal, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to base stations 101-103 and may implement a receive path corresponding to the architecture for receiving in the downlink from base stations 101-103.

Figure 4:
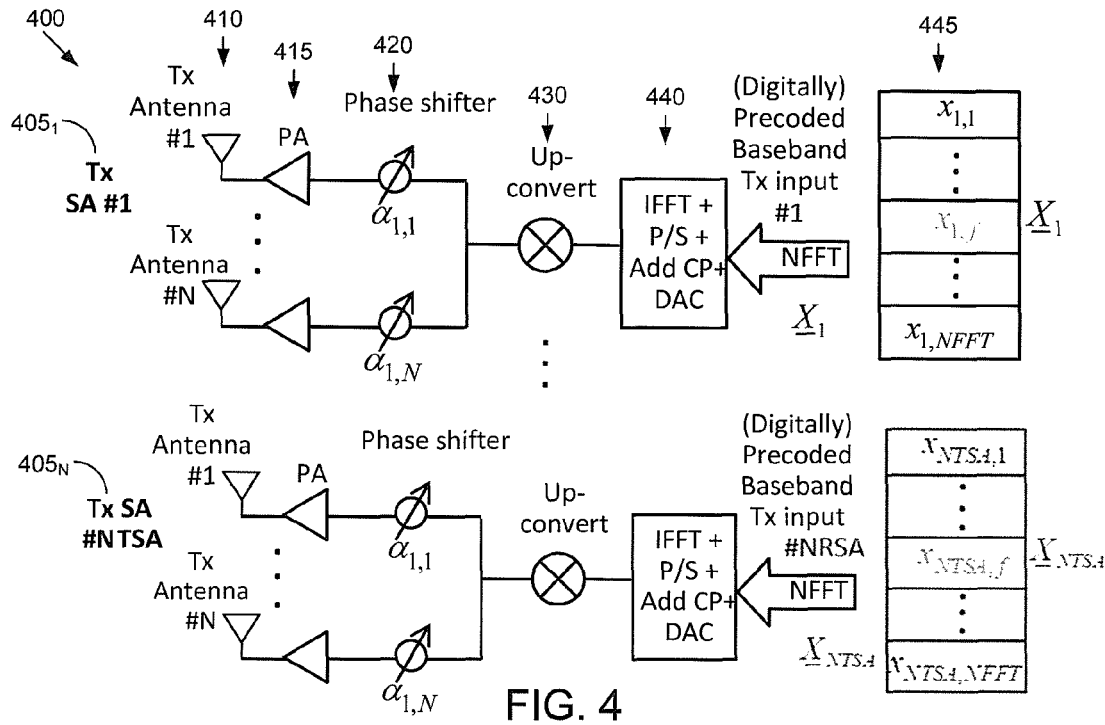
FIG. 4 illustrates an example of a transmitter implementing an AoS architecture according to illustrative embodiments of this disclosure.

FIG. 4 illustrates an example of a transmitter 400 implementing an AoS architecture according to illustrative embodiments of this disclosure. The transmitter 400 may be implemented in a base station, such as base stations 101-103, or a UE, such as UEs 111-116 in FIG. 1. The transmitter 400 may implement a transmit path that is analogous to the transmit processing circuitry 200 in FIG. 2. It may be noted that the "IFFT", "P-to-S", "Add CP" & "DAC" functionalities in block 440 of FIG. 4 correspond to blocks 215, 220, 225 & 226, respectively.

In this illustrative example, transmitter 400 includes NTSA sub-arrays (SAs) 405, numbered from SA #1 ($405_1$) to SA #NTSA ($405_n$). Each SA includes N antennas 410. Each antenna, in turn, is operably connected to/driven by a power amplifier (PA) 415 and a phase-shifter 420, which phase shifts the signal to be transmitted. In these examples, the antennas 410 may include several radiating elements fed from the same input, e.g., a patch antenna.

The effect of the antenna array in each SA 405 is to allow the imposition of a direction-dependent amplitude on the input radio frequency (RF) signal. In the example of Tx SA #1 $405_1$, each set of the antenna phase shifts $\alpha_{1,n}$, n=1, ..., N applied by the phase shifters 420 leads to the output signal displaying a certain directional amplitude gain behavior. The phase shifts could be of the form $$\alpha_n = \frac{2\pi}{\lambda} \cdot n \cdot d \cdot \cos(\phi_0), n = 1, \dots, N,$$

where λ is the wavelength of the signal carrier frequency, and d is the distance between the antennas 410 in the SA $405_1$. In the case where d=λ/2, the signal amplitude gain pattern has a peak at the azimuth angle $$\phi = \cos^{-1}\left(\frac{\phi_0}{\pi \cdot d}\right).$$

As a result, in this example, the direction of maximum gain of the transmitted signal can be adjusted via the SA phase shifts. Such an operation may be referred to as beam steering of transmit beams.

The RF signal to be transmitted is generated by the frequency up-conversion of the baseband signal by up-converters 430, which is the time-domain version, e.g., obtained via a digital-to-analog (DAC) operation on the discrete-time OFDM signal via blocks 440. The discrete OFDM symbol is illustrated as including NFFT subcarriers 445, which span the signal bandwidth in frequency and each of which carries the transmitted information via the subcarriers' complex amplitude. Each SA 405 has a baseband input of an OFDM symbol including NFFT subcarriers.

Figure 5:
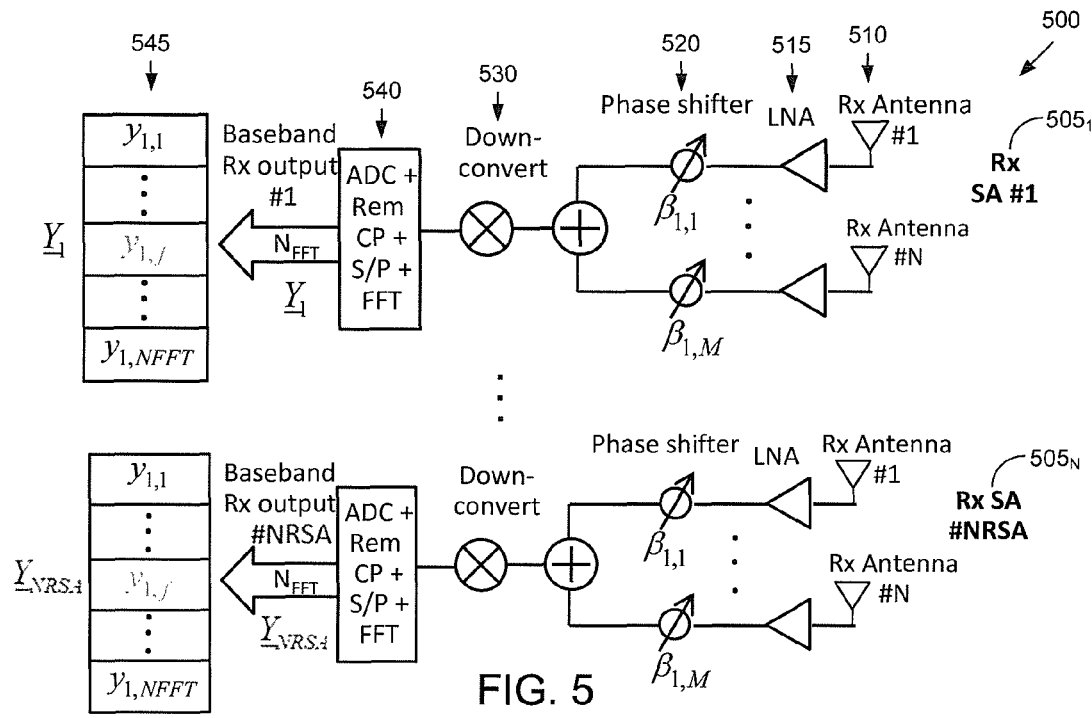
FIG. 5 illustrates an example of a receiver implementing an AoS architecture according to illustrative embodiments of this disclosure.

FIG. 5 illustrates an example of a receiver 500 implementing an AoS architecture according to illustrative embodiments of this disclosure. The receiver 500 may be implemented in a base station, such as base stations 101-103, or a UE, such as UEs 111-116 in FIG. 1. The receiver 500 may implement a transmit path that is analogous to the receive processing circuitry 300 in FIG. 3. It may be noted that the "ADC", "Remove CP", "S-to-P" & "FFT" functionalities in block 540 correspond to blocks 256, 260, 265 & 270, respectively.

In this illustrative example, the receiver 500 includes an analogous structure implementation of the AoS architecture as that of the transmitter 400 in FIG. 4. As discussed above, each receiver SA 505 has a front end section including antennas 510, low-noise amplifiers 515 and phase shifters 520 to impose a certain receive gain with respect to a certain receive direction on the incoming RF signal, which may be referred to as beam steering of receive beams. Reception by the antennas 510 is followed by a down-conversion to baseband frequency via down converters 530, followed by the analog-to-digital operation via block 540, which itself is followed by the operations yielding the digital OFDM symbol at the receiver 500. These OFDM symbols, as in the transmitter 400, include NFFT subcarriers 545 spanning the system bandwidth.

In this disclosure, the term "SA RF beam" or "SA beam" is used in the context of a particular SA to refer to transmissions or receptions by that SA while using a particular set of values for the phase shifts associated with the phase shifters 420 or 520 for each antenna in the SA 405 or 505. For example, referring to transmitter 400, a particular set of values for the phase shifts $\alpha_{1,n}$, n=1, ..., N in SA #1 $405_1$ yields a particular RF beam for SA #1 $405_1$. In this example, these are RF beams used for signal transmission. For an SA RF beam, the transmission or reception via that particular RF beam lasts at least one OFDM symbol and may last several OFDM symbols.

Referring to both FIGS. 4 and 5, in one example, the received (baseband digital) sample $y_{1,f}$ at subcarrier #f of the received OFDM symbol can be written in terms of the baseband digital transmitted sample $x_{1,f}$ at the same subcarrier index #f of the transmitted OFDM symbol according to equation 1.1 below.

$$y_{1,f} = c_{TB1,RB1,f} x_{1,f} + n_{Noise} \quad \text{[Equation 1]}$$

Here, $n_{Noise}$ models the corrupting noise in the receiver 500; $c_{TB1,RB1,f}$ is referred to as the channel coefficient for subcarrier #f and incorporates the reflection, scattering, and other effects imposed on the transmitted signal by the various objects in the propagation channel between the transmitter 400 and receiver 500 where "TB" and "RB" in the subscripts refer to "transmit beam" and "receive beam", respectively. This channel coefficient may be referred to as the "baseband" channel coefficient, since the channel coefficient is the coefficient observed after the received RF signal has been down converted to baseband frequency. The channel coefficient is a function of the subcarrier index for a given transmit/receive RF beam combination. Also, for a given subcarrier index, the channel coefficient is a function of the transmit/receive RF beam combination. This is because the RF beam, in effect, encounters or "lights up" obstructions in the environment between the transmitter 400 and receiver 500. Different RF beams may encounter or light up different obstructions with different reflection/scattering/diffraction effects on the transmitted signal. The channel coefficient for subcarrier #f in this case is denoted as $c_{TB2,RB1,f}$; where, in general, $c_{TB2,RB1,f} \neq c_{TB1,RB1,f}$.

The transmitted sample $x_{1,g}$ on a subcarrier #g carries modulated and coded information, as do the transmitted samples in all other subcarriers. In order to extract the transmitted information on subcarrier #g, the receiver 500 recovers the transmitted sample $x_{1,g}$ from the received sample $y_{1,g}$. For this, the receiver 500 estimates the channel coefficient corresponding to subcarrier #g. To aid the receiver in the estimation of channel coefficients for the various subcarriers in the OFDM symbol, pilot samples with values known to both transmitter 400 and receiver 500 are transmitted at selected subcarrier indices. For example, if subcarrier #f is identified as a pilot subcarrier, then the value $x_{1,f}$ would be known to the receiver 500. Then, with the received sample given as in Equation 1 above, the receiver 500 can then attempt to extract the channel coefficient $c_{TB1,RB1,f}$ using knowledge of the transmitted sample $x_{1,f}$ and the noise and channel coefficient statistics (e.g., via minimum mean squared estimation (MMSE)). Since channel coefficients will, in general, be different across the bandwidth, (e.g., across subcarriers), pilot subcarriers are embedded across the bandwidth as well. The receiver 500 can then interpolate the channel coefficient estimates at the pilot location to generate estimates of the channel coefficients at all subcarriers, which can then be used for other receiver processing. The "pilot samples" referred to above may also be referred to as "pilot symbols", referring to the modulated information in the pilot subcarrier. The terms "pilot samples", "pilot symbols", and "pilot subcarriers" will be used interchangeably in this disclosure.

As noted above, the channel coefficients estimated from the pilot subcarriers are specific to the particular SAs and the particular transmit/receive RF beams used for the transmission/reception of the OFDM symbol containing the pilot subcarriers. For a certain transmit SA+transmit RF beam and receive SA+receive RF beam combination, the action of transmitting and receiving a set of OFDM symbols with pilot subcarriers on the beam combination may be referred to as "pilot scan" with respect to that particular transmit SA and RF beam and receive SA and RF beam combination. A pilot scan, with respect to a certain transmit SA and RF beam and receive SA and RF beam combination, includes at least one OFDM symbol and could include several OFDM symbols. In a pilot scan, with respect to a certain transmit SA and RF beam and receive SA and RF beam combination, for the particular transmit/receive SAs, the transmit and receive RF beams, respectively, are maintained while the OFDM symbol(s) including the pilot subcarriers is/are transmitted and received.

After estimating the channel coefficients, the receiver 500 (e.g., the entity that performs the channel coefficient estimation) may utilize the estimated channel coefficients in a variety of manners. For example, the receiver 500 may utilize the estimated channel coefficients for information demodulation. As mentioned above, the received sample on each subcarrier is of the form: received sample=(channel coefficient)*(transmitted sample)+noise. Knowledge of the channel coefficient helps the receiver 500 in estimating and uncovering the transmitted sample. Since the transmitted samples are selected from a certain signal constellation (e.g. binary phase shift keying (BPSK) constellation, quadrature phase shift keying QPSK constellation, etc.) based on the input data via a process called modulation, this uncovering process may be referred to as demodulation. This uncovering may be utilized, for example, in downlink transmissions, where the BS is the transmitter of information while the UE performs the downlink channel coefficient estimation and uses the coefficients for demodulating the transmitted information.

In another example, the receiver 500 may utilize the estimated channel coefficients for data transmission parameter determination in an example where the BS performs the channel estimation based on pilot scans where the UE is the transmitter. Additionally, the receiver 500 may utilize the estimated channel coefficients for data transmission parameter determination in a time-division-duplex (TDD) system where the same channel bandwidth is used for both uplink and downlink transmissions, in a time multiplexed manner. In such a system, the principle of channel reciprocity may be assumed to operate where, for a given subcarrier, the uplink and downlink channel coefficients are assumed to be the same (or very similar). Considering an example transmission from the UE to the BS at a certain arbitrary time instant t, where the UE transmits using (arbitrarily indexed) RF beam #UE-B1 from the (arbitrarily indexed) SA #UE-SA1, and the BS receives using (arbitrarily indexed) RF beam #BS-B1 from the (arbitrarily indexed) SA #BS-SA1, for a given subcarrier f, let c(Tx UE SA1-B1, Rx BS SA1-B1, f) be the corresponding channel coefficient, which is a function of the transmit UE SA and RF beam as well as the receive BS SA and RF beam. Let a transmission from the BS to the UE be made at a same time instant or a time instant close to the example above, with the BS making the transmission using the same SA # BS-SA1 and the same RF beam #BS-B1 as discussed above. Similarly, let the UE use the same SA #UE-SA1 and the same RF beam #UE-B1 as discussed above, for reception. For the same subcarrier f, the corresponding channel coefficient is c(Tx BS SA1-B1, Rx UE SA1-B1, f), which is a function of the transmit BS SA and RF beam as well as the receive UE SA and RF beam. In this example, channel reciprocity implies that c(Tx UE SA1-B1, Rx BS SA1-B1, f)=c(Tx BS SA1-B1, Rx UE SA1-B1, f). An additional assumption here is that the transmit and receive antennas at both the UE and BS are calibrated, which implies that the gain and phase imposed on a signal when an antenna is acting as a transmitter is the same as the corresponding gain and phase imposed on the signal when the same antenna is acting as a receiver. Additionally, the time duration over which uplink-downlink channel reciprocity can be assumed to hold is related to the speed of the UE. For UEs which are completely stationary, changes in the environment can be expected to be minimal over time, due to which the channel coefficients c(Tx UE SA1-B1, Rx BS SA1-B1, f) and c(Tx BS SA1-B1, Rx UE SA1-B1, f) in the example above can be expected to be the same or similar over longer periods of time. For UEs with higher speeds, such equality or similarity between the channel coefficients will hold over a shorter time period.

With channel reciprocity and antenna calibration, from estimates of the uplink channel coefficients based on the UE pilot transmissions, the BS knows the channel coefficients for the downlink (BS-to-UE) as well. Using these channel coefficients, the BS can then determine the transmission parameters for downlink data transmissions to the UE. These transmission parameters are parameters including transmission rank (i.e., the number of data streams or layers in the transmission), the modulation and coding scheme (MCS) to be used, and the baseband precoder to be used for the data transmission. The channel reciprocity-based derivations of channel coefficients, while most applicable in a TDD system, may be utilized in non-TDD systems as well. Accordingly, embodiments of the present disclosure may be implemented in both TDD and non-TDD systems.

The example configurations of the transmitter 400 and the receiver 500 implementation of the AoS architecture illustrated in FIGS. 4 and 5 are for illustration only. Other embodiments of the transmitter 400 and the receiver 500 could be used without departing from the scope of this disclosure. For example, the receiver 500 could be either the UE (in the case of downlink communication, in which case the BS is the transmitter and the UE the receiver) or the BS (in the case of uplink communication, in which case the UE is the transmitter and the BS the receiver). In another example, the transmitter 400 and the receiver 500 could be implemented in a transceiver architecture sharing components of the transmitter 400 and the receiver 500, for example, the antennas 410 and 510 may only share a common housing.

Figure 6:
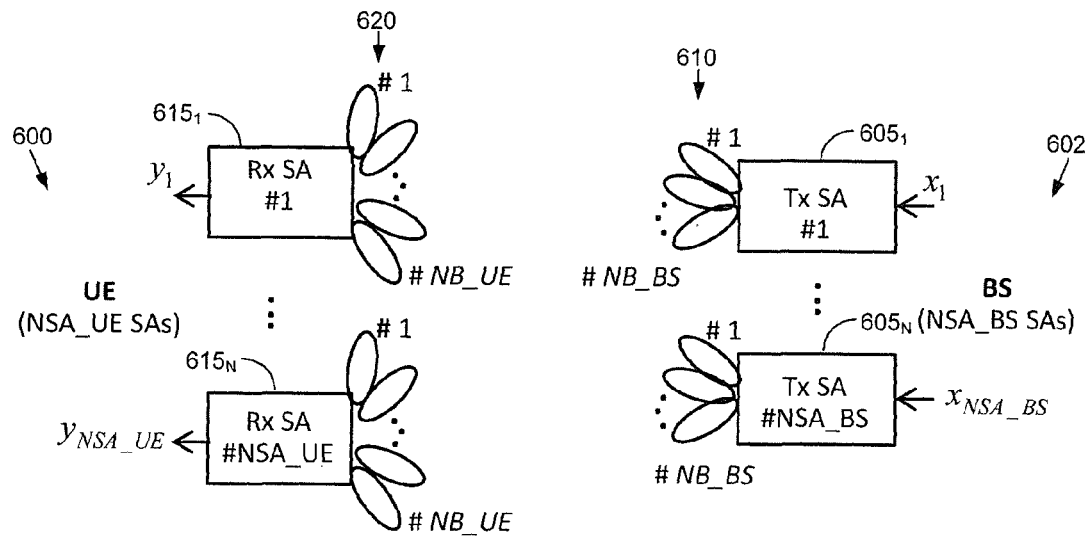
FIG. 6 illustrates an example of downlink communication between a receiver and a transmitter implementing an AoS architecture according to illustrative embodiments of this disclosure.
Figure 7:
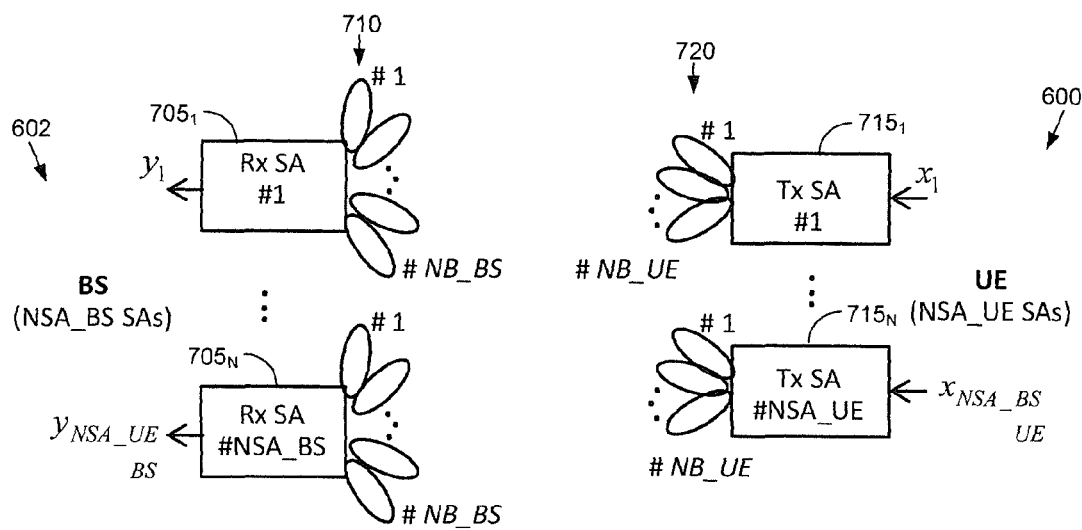
FIG. 7 illustrates an example of uplink communication between a receiver and a transmitter implementing an AoS architecture according to illustrative embodiments of this disclosure.

FIGS. 6 and 7 illustrate examples of downlink and uplink communication, respectively, including receivers and transmitters implementing an AoS architecture according to illustrative embodiments of this disclosure. FIG. 6 illustrates an example of downlink communication between a UE 600 and a BS 602; FIG. 7 illustrates an example of uplink communication between the UE 600 and the BS 602. The UE 600 and the BS 602 may be embodiments of any of the UEs 111-116 and the BSs 101-103, respectively, in FIG. 1, including receivers and transmitters implementing an AoS architecture as discussed above with regard to the embodiments of the transmitter 400 and receiver 500 in FIGS. 4 and 5, respectively.

FIGS. 6 and 7 illustrate the transmit and receive RF beams that may be used by the SAs of the UE 600 and the BS 602. In this example, BS 602 transmits an RF signal to UE 600 using all of its SAs 605, from #1 to #NSA_BS. Here, for any of the SAs #1 to #NSA_BS, BS 602 may use any one of the BS transmit beams #1 to #NB_BS 610. Similarly, UE 600 uses the receive SAs #1 to #NSA_UE 615 to receive the RF signal transmitted by the BS. For any of the SAs #1 to #NSA_UE, it may use any of the UE receive beams #1 to #NB_UE 620. Analogous operation occurs for uplink communication wherein UE 600 transmits an RF signal to BS 602 using all of its SAs 715, from #1 to #NSA_UE. Here, for any of the SAs #1 to #NSA_UE, UE 600 may use any one of the UE transmit beams #1 to #NB_UE 720. BS 602 uses the receive SAs #1 to #NSA_BS 705 to receive the RF signal transmitted by the UE. For any of the SAs #1 to #NSA_BS, it may use any of the BS receive beams #1 to #NB_BS 710.

Given the vast number of beams and subarrays that may be used by a receiver and a transmitter, the number of unique channel paths that may be utilized in communication is vast. Testing the channel conditions for each of these paths find the best set of channel paths to use for communication would be timely, could waste power resources, and given dynamic channel environments, such as a UE moving, may not result in finding the best set of channel paths once all have been explored. Embodiments of the present disclosure provide techniques to enable channel estimation for data transmission parameter determination in OFDM systems employing the array-of-subarrays transceiver architecture.

For transmission operation for a particular UE SA, an RF beam codebook refers to a predefined particular set of a number of RF transmit beams, i.e., a particular set of antenna phase shift values for the antennas in the SA. This set of RF beams would be selected so as to cover a certain geographical area of interest, i.e., such that for any given location lying at less than a certain maximum distance and within a certain angular range with respect to the SA, the SA identifies one of these RF beams such that the location could receive the signal transmitted from that RF beam with a certain required quality. In FIGS. 6 and 7, for example, the set of RF beams may cover a 180 degree geographical area. In addition, the codebook defined RF beams are fixed or predefined in the sense that their direction is defined from their index. For example, an RF beam indexed as #1 would always point to (i.e., transmit in) the same direction (i.e., would always be operated with the same pre-defined set of antenna phase shift values).

Similarly, an RF beam codebook can be defined with respect to each UE SA for the receive operation. While in general, the SA RF beam with a particular index in the receive RF beam codebook could point at a different direction than the RF beam with the same index with respect to the same SA in the transmit RF beam codebook, there is a one-to-one correspondence between the RF beam directions in the transmit and receive RF beam codebooks with respect to an SA. Hence, every RF beam in the transmit RF beam codebook has a counterpart in the receive RF beam codebook with the same SA antenna phase shifts (same up to a possible constant term common to all phase shifts). Also, the transmit and receive codebooks may follow the same default indexing scheme, i.e., RF beams with the same direction may have the same index in both the transmit and receive RF beam codebooks. Similarly, transmit and receive RF beam codebooks are defined with respect to each particular SA at the BS. Further, all SAs, whether at the BS or UE, could be operated with the same transmit RF codebook, and likewise for the receive RF codebook.

Embodiments of the present disclosure provide exhaustive transmit codebook pilot transmission, which may occur periodically in the background (an exhaustive transmit codebook pilot transmission may also be referred to as an exhaustive codebook pilot transmission in this disclosure). In the example of uplink transmissions, an exhaustive transmit codebook pilot transmission refers, with respect to a particular UE SA, to successive transmissions of OFDM symbols including pilot subcarriers, using each and all RF beams in the UE transmit codebook. For example, in the context of FIG. 6, where the BS is the transmitter and the UE the receiver, each transmitter SA 605 transmits a set of OFDM symbols containing pilot subcarriers via RF beam #1, followed by another set via RF beam #2, etc. until #NB_BS. Further, with respect to the BS as a whole, an exhaustive transmit codebook pilot transmission refers to successive exhaustive codebook pilot transmissions from each of its SAs. Similarly, in the context of FIG. 7, where the UE is the transmitter and the BS the receiver, each transmitter SA 715 transmits a set of OFDM symbols containing pilot subcarriers via RF beam #1, followed by another set via RF beam #2, etc. until #NB_UE. As above, with respect to the UE as a whole, an exhaustive transmit codebook pilot transmission refers to successive exhaustive codebook pilot transmissions from each of its SAs. In this disclosure, the # of OFDM symbols per RF beam, the locations of the pilot subcarriers, and the gap (in terms of # of OFDM symbols) between transmissions from successive RF beams of the given SA are expected to be known to the receiver as predefined or via some other signaling. In the case of multiple UE SAs, the gap in # of OFDM symbols between transmissions from the RF beams in successive SAs is expected to be known to the receiver as predefined or via some other signaling as well.

For SA and RF beam index synchronization, the index of a particular RF beam in the codebook may be made known implicitly to both the transmitter 400 and the receiver 500. In this disclosure, such an index for each SA and RF beam from the transmitting side (either BS or UE) may be derived from the details of the exhaustive transmit codebook pilot transmission with respect to the transmitter 400, as described above. Specifically, from the knowledge of the number of SAs and number of RF beams in each SA, both the transmitter 400 and the receiver 500 may derive the index of the transmit SA 405, as well as the indices of the RF beams in that SA 405, from the order in which they were used to transmit OFDM symbols containing the pilot subcarriers as part of the exhaustive transmit codebook pilot transmission.

In one example, in the context of FIG. 7, with respect to which the exhaustive transmit codebook pilot transmission from the UE was described, assuming that the pilot transmission from one RF beam lasts (arbitrarily) 2 OFDM symbols and all the RF beams are transmitted successively (i.e., no gaps between transmissions from different RF beams), the exhaustive transmit codebook pilot transmission from the single UE SA lasts 2*NB_UE (the number of transmit RF beams in the SA) OFDM symbols. Assuming that indices start from 1 (arbitrarily), both the UE 600 and the BS 602 label the UE RF beam that was used for transmission on the first 2 OFDM symbols of the exhaustive transmit codebook pilot transmission as RF beam #1, the RF beam used on the next 2 OFDM symbols would be indexed as RF beam #2, and so on.

In another example, in the context of FIG. 7, for a UE 600 with two SAs, each with NB_UE beams, further assuming that there are no gaps between transmissions from successive SAs, the exhaustive transmit codebook pilot transmission from the two UE SAs lasts 4*NB_UE OFDM symbols. Now, the UE and the BS would index the SA corresponding to the $1^{st}$ 2*NB_UE OFDM symbols as SA #1, and the SA corresponding to the $2^{nd}$ 2*NB_UE OFDM symbols as SA #2. The RF beams in each SA would then be indexed sequentially as described above. These example indexing methods may be extended out for UEs with NSA_UE number of SAs as illustrated in FIG. 7.

In some embodiments, the presence of periodic exhaustive transmit codebook pilot transmission from each BS SA may occur as well as described above for the UE SAs. The details of such a transmission, e.g., the mapping between OFDM symbols and the transmitting SA RF beams, the number of OFDM symbols per SA RF beam containing the pilot subcarriers, the periodicity of the exhaustive transmit codebook pilot transmissions in number of OFDM symbols are controllable from the BSs and known to all UEs. The purpose of such periodic pilot transmissions would be to help each UE determine favorable BS SA transmit and UE SA receive RF beam combinations. Similarly, in some embodiments, periodic exhaustive transmit codebook pilot transmission may occur from each UE SA as well. These transmissions are intended to help the BS identify favorable UE SA transmit and BS SA receive RF beam combinations.

In these illustrative embodiments, in the context of FIG. 6, the BS 602 determines the data transmission parameters and conveys them to the UE 600 prior to commencing the downlink (BS-to-UE) data transmission. The following describes a process with respect to the BS 602 and a particular UE 600 aimed at enabling the availability of downlink data transmission parameters at the BS. A similar process may be applied to uplink communication as illustrated in FIG. 7.

The BS 602 identifies a set of preferred receive RF beams for each of the BS SAs. The identification could be via a signal angle-of-arrival (AoA) estimation algorithm, in which case the RF beams may not belong to the RF beams in the BS receive RF beam codebook. For each BS SA, the BS 602 identifies a set of preferred receive RF beams via a technique. In one example, the BS 602 identifies the preferred BS receive RF beam indices from the receive codebook for a particular BS SA. Assuming the presence of periodic exhaustive transmit codebook pilot transmissions from the UE 600, the BS 602 may identify the set of receive RF beam indices yielding the maximum average received powers. Such a set can then be denoted as the preferred set of received beam indices for that SA. In another example, the BS 602 identifies preferred unconstrained BS receive RF beams for a particular BS SA. By utilizing the exhaustive transmit codebook pilot transmissions from the UE SAs, the BS 602 may identify a set of receive directions yielding the maximum average received powers via signal angle-of-arrival estimation techniques. In general, such RF beams may not lie in the predefined receive RF beam codebook. A subset of these could be identified as the preferred receive RF beam set at the BS (for any SA). For example, the BS 602 may identify concentration of received signal power at one or more angles and select one or more beams along these angles, which may or may not directly correspond to the beam steering directions of the codebook defined beam indices. Using principles of reciprocity, the BS may also identify a set of preferred transmit RF beams or signal angle-of-departure (AoD) directions corresponding to the preferred receive RF beams or AoA directions.

Similarly, the UE identifies a set of preferred UE transmit RF beams. This identification could be via a signal AoA estimation algorithm at the UE 600 to determine preferred receive RF beam directions, followed by an application of the reciprocity principle to derive preferred transmit RF beam directions. The RF beams may not belong to the RF beams in the UE receive (or transmit) RF beam codebook.

For each UE SA, the UE 600 identifies a set of preferred transmit RF beams. This identification proceeds by first identifying a set of preferred receive RF beams for that SA, followed by the application of the channel reciprocity principle to identify the preferred transmit RF beams for that SA. In one example, the UE 600 may identify the preferred UE receive RF beam indices from the receive codebook for a particular UE SA. Assuming the presence of periodic exhaustive transmit codebook pilot transmissions from each BS SA, from such transmissions, the UE 600 may determine the particular RF beam indices that yield the maximum average received powers (e.g., across all BS SA and RF beam transmissions). The UE 600 may then identify a certain number of these UE receive beam indices, sorted, for example, in decreasing received power order, as the preferred set for that SA. In another example, the UE 600 may identify preferred unconstrained UE receive RF beams for a particular UE SA. By utilizing the exhaustive transmit codebook pilot transmissions from the BS SAs, the UE 600 may identify a set of receive directions yielding the maximum average received powers via signal angle-of-arrival estimation techniques. In general, such RF beams may not lie in the predefined RF beam codebook. The UE may then identify a subset of RF beams as the preferred receive RF beam set at the UE for any SA.

From the per-SA preferred receive RF beams as identified above via usage of the periodic exhaustive transmit codebook pilot transmissions from each BS SA, the UE 600 may utilize the principle of uplink-downlink channel reciprocity to identify the corresponding transmit RF beams as the preferred transmit beams. For example, if a certain RF beam has been identified as a preferred receive beam for a particular UE SA, then that same beam may be also identified as a preferred transmit beam for that SA (e.g., the indices of the two beams are designed to have the same index). This follows from the general assumption, as mentioned earlier, that RF beams in the same direction, whether transmit or receive, are designed to have the same index.

The BS 602 then signals to the UE 600 the parameters for a pilot scan with respect to the preferred SA RF beams (transmit RF beams with respect to the UE and receive RF beams with respect to the BS). In these pilot scans, the UE 600 is the transmitter while the BS 602 is the receiver for determining downlink transmission parameters. The UE 600 performs pilot scans with respect to the preferred transmit RF beams identified earlier (e.g., in the three preceding paragraphs). For example, for each UE SA, the BS 602 conveys a certain number of preferred transmit RF beams for the UE 600 to use for the pilot scan. For each particular UE SA and RF beam combination, the UE 600 identifies the location of the OFDM symbols and the locations of the pilot subcarriers within those OFDM symbols that are to be used for the pilot scan transmissions from that UE SA and RF beam combination. Such identification may be based on explicit indications from the BS, or the identification may be implicit. For example, the pilot scan transmissions from the UE 600 may begin a fixed number of OFDM symbol durations after the reception of the communication including the number of preferred transmit RF beams to use. The locations of the pilot subcarriers within the OFDM symbols may be pre-defined as per wireless standards specification known to both the BS 602 and the UE 600. The number of preferred transmit RF beams to use and the location of the pilot subcarriers to use may be communicated separately, i.e., may not be part of the same message from the BS 602 to the UE 600.

In response to the indication of the pilot scan parameters from the BS 602, a pilot scan is performed with respect to the UE transmit SA and RF beam and BS receive SA and RF beam combinations identified above and as further specified with respect to the number of preferred UE per-SA RF beams and the OFDM symbol and pilot subcarrier locations conveyed.

The UE 600 transmits pilot OFDM symbols from the indicated number of RF beams in a particular SA before continuing to transmissions from the next SA. The order in which the SAs are picked may be arbitrary or in order of decreasing or increasing received signal power (for example, as determined earlier from the exhaustive BS pilot scans four paragraphs above). Using knowledge of the number of UE SAs and the number of RF beams in each SA, both the UE 600 and BS 602 may assign indices to the SAs and RF beams based on increasing time order of transmission. Since these (SA/RF beam) indices are arrived at by considering their relation to transmission order, they are referred to as relative indices. These relative indices are used to index the UE transmit RF beams by the BS for subsequent indication to the UE.

In one illustrative example, assuming the UE has two SAs with four RF beams each, the UE 600 identifies four preferred RF beams (transmit/receive) in each SA. These RF beams may not be the same as those defined in the RF beam codebook. The UE may number the RF beams in each SA in the order of the strength of the metric used to decide them as preferred, as RF beam #1=most preferred, #2=second most preferred, #3=third most preferred, and #4=fourth most preferred. Here, numbering has been chosen arbitrarily to be from 1 to 4. Then, if the BS 602 instructs the UE 600 to transmit from two preferred RF beams, based on this numbering, RF beam #s 1 and 2 would be selected. Other numbering schemes for the RF beams may be utilized via some mapping between the indices.

Figure 8:
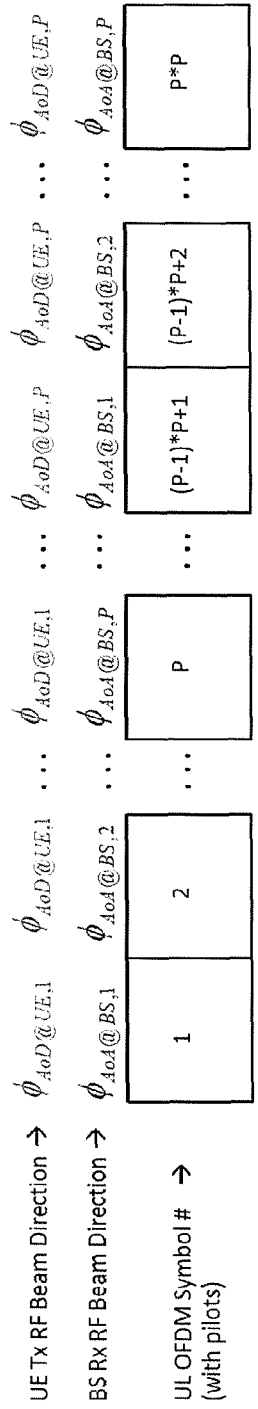
FIG. 8 illustrates an example timing diagram for pilot signal transmission and channel estimation according to illustrative embodiments of this disclosure.

FIG. 8 illustrates an example timing diagram for pilot signal transmission and channel estimation according to illustrative embodiments of this disclosure. In this illustrative example, the BS 602 instructs the UE 600 to perform a pilot scan with respect to P preferred UE transmit beams for each SA. FIG. 8 illustrates an example timing diagram for pilot signal transmissions from a particular UE SA. The UE 600 selects an SA and the P preferred beams from the identified RF transmit beams corresponding to the strongest AoA/AoD directions or strongest codebook defined RF beams. The UE 600 successively transmits the agreed-upon number of pilot OFDM symbols using these P number of beams. For example, as illustrated in FIG. 8, for each of the P UE transmit beam directions, the UE transmits the pilot signals using a single OFDM symbol P times, one time for each AoA direction estimation or preferred receive RF beam for channel estimation at the BS 602. Hence, a total of P*P OFDM symbols are utilized for the pilot scans per UE SA.

The UE 600 and BS 602 then index the SA and RF beam corresponding to the first transmission as (SA #1, RF beam #1), and similarly, the SA and RF beam corresponding to the second transmission as (SA #1, RF beam #2), and so on. Since both the BS 602 and UE 600 know that P number of RF beams are to be transmitted from this SA, the BS 602 and UE 600 both know that RF beam #P will be the last RF beam index for this SA. Also, since both the BS 602 and UE 600 know the number of SAs used by the UE 600, the BS 602 and UE 600 both know that the next SA index should be 2. The UE 600 indexes the RF beams for that SA as 1 to P. The UE 600 then successively transmits the agreed-upon number of pilot OFDM symbols using these beams Recognizing, as mentioned, that the transmissions from the first SA have already occurred, the BS 602 and UE 600 then index the SA and RF beam corresponding to each of the transmissions for later determination of the best or preferred UE/BS SA and RF beam combination(s) for data transmission. As a result, the BS 602 and UE 600 derive the same relative indices for the SA and RF beam combinations involved in the pilot OFDM symbol transmissions from the UE 600.

Based on the channel estimation via the pilot scans as discussed above, the BS 602 determines downlink data transmission parameters for data transmission to the UE 600. These data transmission parameters may include the relative RF beam index for each UE 600 receive SA to be used for the subsequent DL transmissions. As discussed above, the BS 602 assumes that RF beams pointing in the same direction, whether transmit or receive, have the same index. As a result, the BS 602 can translate the relative UE transmit RF beam indices derived from the pilot transmissions to preferred UE receive RF beam indices. The UE 600 understands this translation as well, and thus, the UE 600 can identify the RF receive beams the BS 602 intends for the UE 600 to use, even though the BS 602 may not know the codebook defined beam or AoD of the transmit beam the UE 600 used during the pilot transmissions. These data transmission parameters may also include a transmit RF beam for each BS transmit SA. Similar to the determination for the UE beams, the BS transmit RF beams for a particular SA point in the same direction as one of the receive BS RF beams identified as preferred or best as a result of the UE pilot transmissions. The data transmission parameters may further include other parameters, such as, for example, without limitation, the transmission rank and the digital precoder and the modulation and coding scheme (MCS) to be used for transmission.

Next, the BS 602 conveys to the UE 600 information needed for receiving downlink data transmissions. For example, for each UE SA, the BS 602 may convey information for the UE to identify the RF beam(s) to be used for reception (e.g., via relative beam index as discussed above), the transmission rank, MCS, and/or location (OFDM symbol locations and the locations of the subcarrier resources within those OFDM symbols) of the forthcoming data transmission. Some of the OFDM subcarriers comprising the data transmission represent pilot samples which may help with data demodulation, and which are accordingly precoded the same way as the data. The UE-specific demodulation reference symbol (DMRS) in the 3GPP specifications is an example of such a strategy. It may be noted here that for a given OFDM symbol, a given UE SA may only use a single RF beam for reception. However, the BS may convey information pertaining to more than one receive RF beams per UE SA. This may happen, for example, in cases where more than one receive RF beams are estimated by the BS to yield similar performance.

Thereafter, the BS 602 transmits data (with the possible embedded demodulation pilots) to the UE 600 using the transmit SA RF beams as determined above and on the OFDM symbols as indicated to the UE 600. The UE 600 receives the transmissions using the SA RF beams as indicated by the BS 602 and identified by the UE 600. As in the case of UE reception, it may be noted that for a given OFDM symbol, a BS SA may only transmit using a single RF beam.

These embodiments enable the BS 602, aided by the UE 600, to determine suitable RF beams (transmit RF beams determined by the BS 602 and receive RF beams by the UE 600) by using longer-term measurement averaging and metrics, and then enable the BS 602 to derive the instantaneous or short term channel coefficients with respect to those RF beams to determine data transmission parameters (in particular, the transmission rank, digital precoder, and MCS) for enhanced performance. As compared to an alternate strategy where all the data transmission parameters (including the RF beams) are selected via instantaneous or short term metrics, such a strategy of determining suitable RF beams with respect to longer term metrics can be expected to lead to lower pilot overhead requirements, while the ability to estimate and use instantaneous or short term channel coefficients with respect to those RF beams can be expected to yield competitive performance.

As a further example, in one embodiment, the indication by the BS 602 to the UE 600 of the per-SA number of preferred RF beams to use for the pilot scan may be of the four where the indication message includes fields, such as, for example, the number of preferred per-SA RF beams and time period over which the number of preferred RF beams is valid. In this embodiment, the UE 600 interprets the indicated number of preferred per-SA RF beams to be valid over the indicated time period, without requiring any further such messages from the BS 602.

As a further example, in one embodiment, the UE 600 may communicate to the BS 602 the number of preferred RF beams for each SA for the pilot scan instead of the other way around. As discussed above, this indication could be valid for a particular time span. The details of such UE reporting may be indicated by the BS 602. Specifically, the BS 602 may indicate whether the report is for one time or periodic, the periodicity of such reporting, and the OFDM symbol resource to use for such reporting. The BS 602 may then send a message to the UE 600 updating the number of per-SA preferred RF beams indicated by the UE 600. In this case, the UE 600 uses the number of RF beams for each SA as indicated by the BS 602 going forward. These steps for the UE determination of the number of preferred RF beams for each SA for the pilot scan may occur separately from or periodically with the BS determination of the number of preferred RF beams for each SA for the pilot scan.

Figure 9:
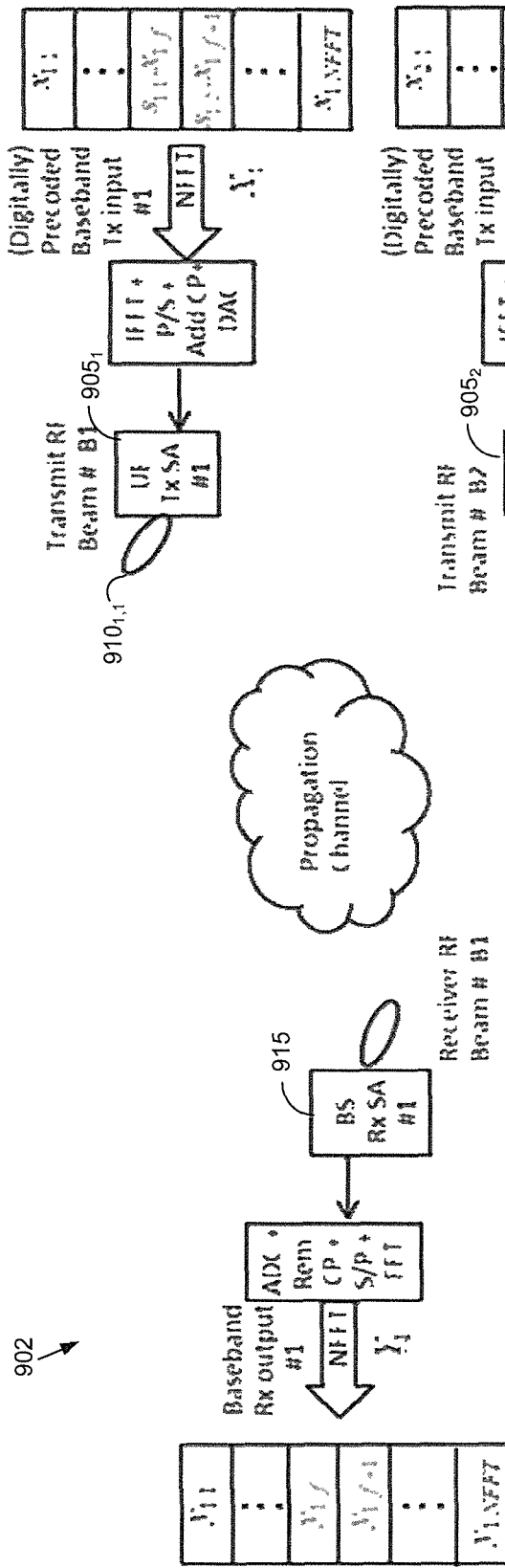
FIG. 9 illustrates an example of channel estimation using spreading codes across pilot subcarriers in a wireless communication system according to illustrative embodiments of this disclosure.

FIG. 9 illustrates an example of channel estimation using spreading codes across pilot subcarriers in a wireless communication system according to illustrative embodiments of this disclosure. As a further example, in this illustrative embodiment, more than one UE transmit SA and RF beam combinations may be allocated the same pilot subcarrier (e.g., in the same OFDM symbol) for the pilot scan. In this example, the UE 900 has two transmit SAs 905, and the BS 902 has one receive SA 915. The transmit RF beam #TB1 from SA #1 905$_1$ and the transmit RF beam #TB2 from SA #2 905$_2$ are both allocated to transmit pilot samples on subcarriers f and (f+1). At each subcarrier, each SA 905 transmits the product of the actual pilot sample and a spreading code coefficient. For example, on subcarrier f, transmit RF beam #TB1 910$_{1,1}$ from SA #1 905$_1$ transmits the product where $s_{1,1}$ is the spreading code coefficient and $x_{1,f}$ is the pilot sample.

The spreading code coefficient is used to allow estimation of the channel coefficients as follows:

1) SA #1 905$_1$ uses spreading code coefficients $s_{1,1}$ and $s_{1,2}$ on subcarriers f and (f+1), respectively.
2) SA #2 905$_2$ uses spreading code coefficients $s_{2,1}$ and $s_{2,2}$ on subcarriers f and (f+1), respectively.
3) The spreading code values are selected such that $s_{1,1}^2 = s_{2,1}^2 = s_{1,2}^2 = s_{2,2}^2 = 1$, and $s_{1,1} \cdot s_{2,1} + s_{1,2} \cdot s_{2,2} = 0$, i.e., the codes are orthogonal and have unit magnitude.
4) As a result, $s_{1,1} \cdot y_{1,f} + s_{1,2} \cdot y_{1,f+1} = s_{1,1} \cdot (c_{TB1,RB1,f} \cdot s_{1,1} \cdot x_{1,f} + c_{TB2,RB1,f} \cdot s_{2,1} \cdot x_{2,f} + n_{Noise,f}) + s_{1,2} \cdot (c_{TB1,RB1,f+1} \cdot s_{1,2} \cdot x_{1,f+1} + c_{TB2,RB1,f+1} \cdot s_{2,2} \cdot x_{2,f+1} + n_{Noise,f+1}) = (c_{TB1,RB1,f} \cdot x_{1,f} + c_{TB2,RB1,f} \cdot s_{1,1} \cdot s_{2,1} \cdot x_{2,f} + s_{1,1} \cdot n_{Noise,f}) + (c_{TB1,RB1,f+1} \cdot x_{1,f+1} + c_{TB2,RB1,f+1} \cdot s_{1,2} \cdot s_{2,2} \cdot x_{2,f+1} + s_{1,2} \cdot n_{Noise,f+1})$ where use has been made of the equations $s_{1,1}^2 = s_{2,1}^2 = s_{1,2}^2 = s_{2,2}^2 = 1$. For $x_{1,f} = x_{1,f+1}$ and $x_{2,f} = x_{2,f+1}$, (i.e., the same pilot samples are transmitted on subcarriers f and (f+1) by the respective RF beams in the respective SAs) and given that f and (f+1) are adjacent subcarriers, it is reasonable to assume that $c_{TB1,RB1,f} \approx c_{TB1,RB1,f+1}$ and $c_{TB2,RB1,f} \approx c_{TB2,RB1,f+1}$, i.e., that the channel coefficients on adjacent subcarriers are almost the same. Denoting $c_{TB1,RB1,f} \approx c_{TB1,RB1,f+1}$ as $c_{TB1,RB1}$ and $c_{TB2,RB1,f} \approx c_{TB2,RB1,f+1}$ as $c_{TB2,RB1}$, the above expression simplifies to equation 2 as shown below:

$$s_{1,1} \cdot y_{1,f} + s_{1,2} \cdot y_{1,f+1} = c_{TB1,RB1} \cdot x_{1,f} + c_{TB2,RB1} \cdot (s_{1,1} \cdot s_{2,1} + s_{1,2} \cdot s_{2,2}) \cdot x_{2,f} + s_{1,1} \cdot n_{Noise,f} + s_{1,2} \cdot n_{Noise,f+1} = c_{TB1,RB1} \cdot x_{1,f} + n_{Noise,1}$$ [Equation 2]

Similarly, equation 3 below shows that:

$$s_{2,1} \cdot y_{1,f} + s_{2,2} \cdot y_{1,f+1} = c_{TB2,RB1} \cdot x_{2,f} + n_{Noise,2}$$ [Equation 3]

As a result, with the knowledge of the spreading code coefficients and the pilot samples from the received samples $y_{1,f}$ and $y_{1,f+1}$ at the subcarriers f and (f+1), respectively, the BS 902 can form the linear combinations $s_{1,1} \cdot y_{1,f} + s_{1,2} \cdot y_{1,f+1}$ and $s_{2,1} \cdot y_{1,j} + s_{2,2} \cdot y_{1,j+1}$ as in Equations 2 and 3 and then proceed to estimate the channel coefficients $c_{TB1,RB1}$ and $c_{TB2,RB1}$.

For such a spreading-sequence based scheme to be used, both the transmitter and receiver may need prior knowledge of the spreading code coefficients as well as the pilot samples on which they are used. In case a spreading scheme as above is used in this embodiment, information for identifying the spreading scheme to be used may be included with or conveyed around the same time as the information regarding the number of beams to use for the pilot scan as discussed above. Such an indication may be implicit in the sense of being communicated as part of a prior system setup communication.

The present disclosure further provides embodiments where the BS 602, rather than the UE 600, determines the set of preferred UE RF transmit beams. In these embodiments, the BS 602 determines the data transmission parameters and conveys them to a particular UE 600 prior to commencing the downlink data transmission.

To begin the channel estimation process, the BS 602 identifies a set of preferred receive RF beams for each of the BS SAs. The identification could be via a signal angle-of-arrival (AoA) estimation algorithm, in which case the RF beams may not belong to the RF beams in the BS receive RF beam codebook. Similarly, for each UE SA, the BS 602 identifies a set of preferred transmit RF beam indices out of the indices of RF beams in the UE transmit RF beam codebook. For example, the BS 602 may identify the preferred BS receive RF beams for a particular BS SA as discussed above as a result of periodic exhaustive codebook RF beam transmissions by the UE.

Similarly, the BS 602 may identify the preferred UE transmit RF beam indices for a particular UE SA as a result of the presence of periodic exhaustive transmit codebook pilot transmissions from the UE SA. From such transmissions, the BS 602 may determine the particular RF beam indices that yield the maximum average received powers (e.g., across all the RF beam indices in the receive RF beam codebooks across all SAs for the BS 602). The BS 602 may then identify a certain number of these UE transmit beam indices, sorted in decreasing received power order, as the preferred set. As discussed above, the UE RF beam indices may be synchronized at the BS 602 and UE 600 with the BS 602 knowing the order of the RF beams and SAs used for the pilot transmissions.

The BS 602 identifies a set of preferred UE transmit RF beam indices from the UE transmit RF beam codebook for each of the UE SAs for the pilot scan. The BS 602 may then communicate to the UE 600 information including, for each UE SA, a subset (which could include all the preferred RF beams identified above) of the preferred transmit RF beam indices for that SA. The information conveyed by the BS 602 may further include, for each particular UE SA and RF beam combination, the location of the OFDM symbols as well as the locations of the pilot subcarriers within those OFDM symbols that are to be used for the pilot scan transmissions from that UE SA and RF beam combination. This indication by the BS 602 may be explicit or implicit. For example, the pilot scan transmissions from the UE 600 could begin a fixed number of OFDM symbol durations after the reception of the communication by the BS 602. The information conveyed to the UE 600 may be conveyed in a single message or separate messages.

Thereafter, the BS 602 signals to the UE 600 the parameters for a pilot scan with respect to the SA RF beams. A pilot scan with respect to these RF beams is then performed.

In these pilot scans, the UE 600 is the transmitter while the BS 602 is the receiver. The pilot scan may occur as discussed above with regard to FIG. 8. However, in this example, the transmit beams used by the UE 600 to transmit the pilot signals are codebook defined, while the receive beams used by the BS 602 may or may not be constrained to codebook defined receive beams. The indexing of the UE SAs and RF beams may also be performed as discussed above.

The BS 602 then determines, from the channel coefficients estimated and via the uplink-downlink channel reciprocity principle, the downlink data transmission parameters, which may include for each UE/BS SA, the UE receive RF beam and the BS transmit RF beam to be used, respectively; the transmission rank; the digital (baseband) precoder to be used at the BS; and/or the MCS to be used. The BS conveys to the UE, for each UE SA, the RF beam index (with respect to the UE receive RF beam codebook) to be used for reception, the transmission rank, MCS, and/or location (within a certain set of OFDM symbols) of the forthcoming data transmission. As discussed above, UE-specific demodulation pilots are assumed to be among the OFDM subcarriers comprising the data.

The BS 602 transmits data (with the embedded demodulation pilots, as discussed above) to the UE 600 using the transmit SA RF beams as determined above, and on the OFDM symbols as indicated to the UE 600. The UE 600 receives the transmissions using the SA RF beams as indicated by the BS 602.

These embodiments enable the BS 602 to determine suitable RF beams by using longer-term measurement averaging and metrics and then derive the instantaneous or short term channel coefficients with respect to those RF beams to determine data transmission parameters (in particular, the transmission rank, digital precoder, and MCS) for enhanced performance. These embodiments may reduce the time for channel estimation and calculations needed to be performed by the UE.

In yet further embodiments, similar to those discussed above, the BS 602 may determine the data transmission parameters and convey them to a particular UE 600 prior to commencing the downlink data transmission. In these embodiments, the BS 602 provides a message to a particular UE 600, indicating to the UE 600 the operating assumptions that are in effect. As a result of this message, the BS and UE have the same understanding with respect to the operating assumptions in effect. In particular, the UE has an understanding of whether it is to use the exhaustive BS pilot scans to estimate per-SA preferred transmit beams, or whether these will be indicated by the BS. In the latter case, for example, the BS 602 may indicate whether assumptions regarding the exhaustive transmit codebook pilot transmissions from the BS SAs that the UE 600 is expected to use to determine the set of per-SA preferred RF beams. The BS 602 may also indicate the exhaustive transmit codebook pilot transmissions from the UE SAs that the BS will use to identify the set of per-SA preferred RD beams. The BS 602 may further indicate details about the number of preferred per-SA RF beams to identify. For example, the message(s) from the BS 602 may include a maximum number of preferred per-SA RF beams that the BS 602 will indicate and/or a time period for which such a number is valid.

These embodiments of the present disclosure may utilize a combination of the examples and processes described above. Further embodiments may be derived by utilizing a particular subset of operational steps as discussed above.

Figure 10:
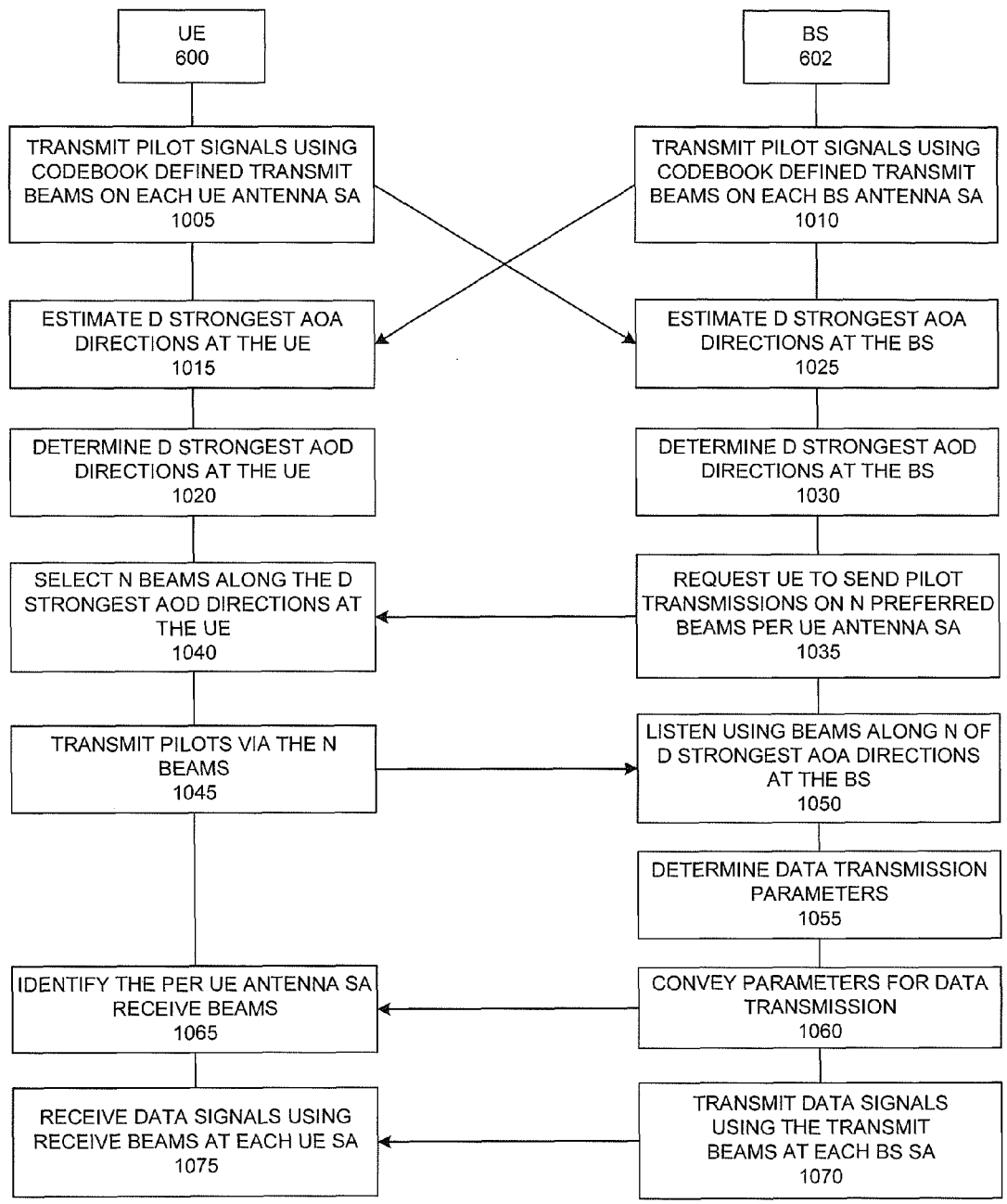
FIG. 10 illustrates a flowchart of a process for channel estimation in a wireless communication system including receivers and transmitters implementing an AoS architecture according to some embodiments of this disclosure.

FIG. 10 illustrates a process for channel estimation in a wireless communication system including receivers and transmitters implementing an AoS architecture according to some embodiments of this disclosure. For example, the process depicted in FIG. 10 may be performed by the UE 600 and the BS 602 in FIGS. 6 and 7.

The process begins with the UE 600 and the BS 602 transmitting pilot signals using codebook defined transmit beams on each UE and BS antenna SAs, respectively (steps 1005 and 1010). For example, in these steps, the UE 600 and the BS 602 may periodically perform exhaustive codebook pilot transmissions for mapping out the channel conditions between the UE 600 and the BS 602.

Thereafter, the UE 600 and the BS 602 estimate D number of strongest AoA directions at the UE and the BS, respectively (steps 1015 and 1025). For example, in these steps, the UE 600 and the BS 602 may identify which receive signal paths produce the strongest received signals and/or where the stronger signal paths are present in the propagation channel between the UE 600 and the BS 602. These AoA directions may or may not correspond to the directions of the codebook defined beams.

The UE 600 and the BS 602 may then determine D number of strongest AoD directions at the UE 600 and the BS 602, respectively (steps 1020 and 1030). For example, in these steps, the UE 600 and the BS 602 may use channel reciprocity principles to identify which directions are best or preferred for transmitted signals. In a specific case, the usage of channel reciprocity could involve identifying the AoD directions to be the same as the AoA directions. These steps may be optional if, for example, the UE 600 or the BS 602 does not transmit pilot signals during the pilot scan discussed below. For example, the BS 602 may not need to derive AoD directions for the pilot scan if the BS 602 is simply receiving the signals in the pilot scan. Steps 1005 to 1030 may be performed periodically in the background.

Thereafter, the BS 602 sends a request to the UE to send pilot transmissions on N preferred beams per UE antenna SA (step 1035). For example, in step 1035, the BS 602 may request a pilot scan of N potential preferred beam paths for pilot scans. The number N may be set in advance and may be all of or a subset of the D direction identified above.

The UE 600 then selects N beams along the D strongest AoD directions at the UE (step 1040). For example, in step 1040, the UE 600 selects the number based on the BS's 602 request or could determine the number N independently. As discussed above, number N of the beams to use for the pilot scan may be set in advance and may be all of or a subset of the D direction identified above.

Thereafter, the UE 600 transmits pilots via the N beams (step 1045). For example, in step 1045, the UE 600 may transmit the pilots for the pilot scan as depicted in FIG. 8. The UE 600 may successively transmit pilots on one or more OFDM symbols per UE transmit beam per BS receive beam per UE SA (e.g., a total of N*N number of pilot signal transmissions per SA).

At each SA of the BS 602, the BS then listens using beams along N of D strongest AoA directions at the BS (step 1050). For example, in step 1050, the BS 602 may listen to the pilots transmitted on each of the N UE transmit beams from a particular UE SA via each of the N BS receive beams at each BS SA in order to estimate the channel quality at each of the N UE and N BS beam combinations for each UE & BS SA.

Thereafter, the BS 602 determines data transmission parameters (step 1055). For example, in step 1055, the BS 602 may determine the receive beams at each UE SA, the transmit beam at each BS SA, the transmission rank, digital precoder (which may or may not belong to a codebook), and/or the MCS for the subsequent data transmissions.

The BS 602 then conveys the parameters for the forthcoming data transmission to the UE 600, as well as the receive beams at each UE SA (step 1060). For example, in step 1060, the BS 602 may send information identifying the UE beams via a relative index based on the order of the pilot transmissions from step 1005 for the UE 600 to identify the exact beams to use. The BS 602 may also convey the transmission rank, digital precoder (non-codebook), and/or the MCS for the subsequent data transmissions.

Thereafter, the UE 600 identifies the receive beams to use at each UE SA for the subsequent data transmission (step 1065). For example, in step 1065, the UE 600 may identify the beams based on a relative index from the BS 602 and correlate the index received to the order in which the beams were used during the pilot scan.

Thereafter, the BS 602 transmits data signals using the transmit beams at each BS SA (step 1070), and the UE 600 receives the data signals using the receive beams at each UE SA (step 1075) identified as discussed above. The process for channel estimation and data transmission parameter determination may occur periodically based on a set duration for using such determined parameters or may be triggered dynamically based on changing channel conditions, UE movement speed, when data transmission performance declines below an acceptable level, or upon the need to initiate a data transmission due to the arrival of information meant for the UE at the BS.

Figure 11:
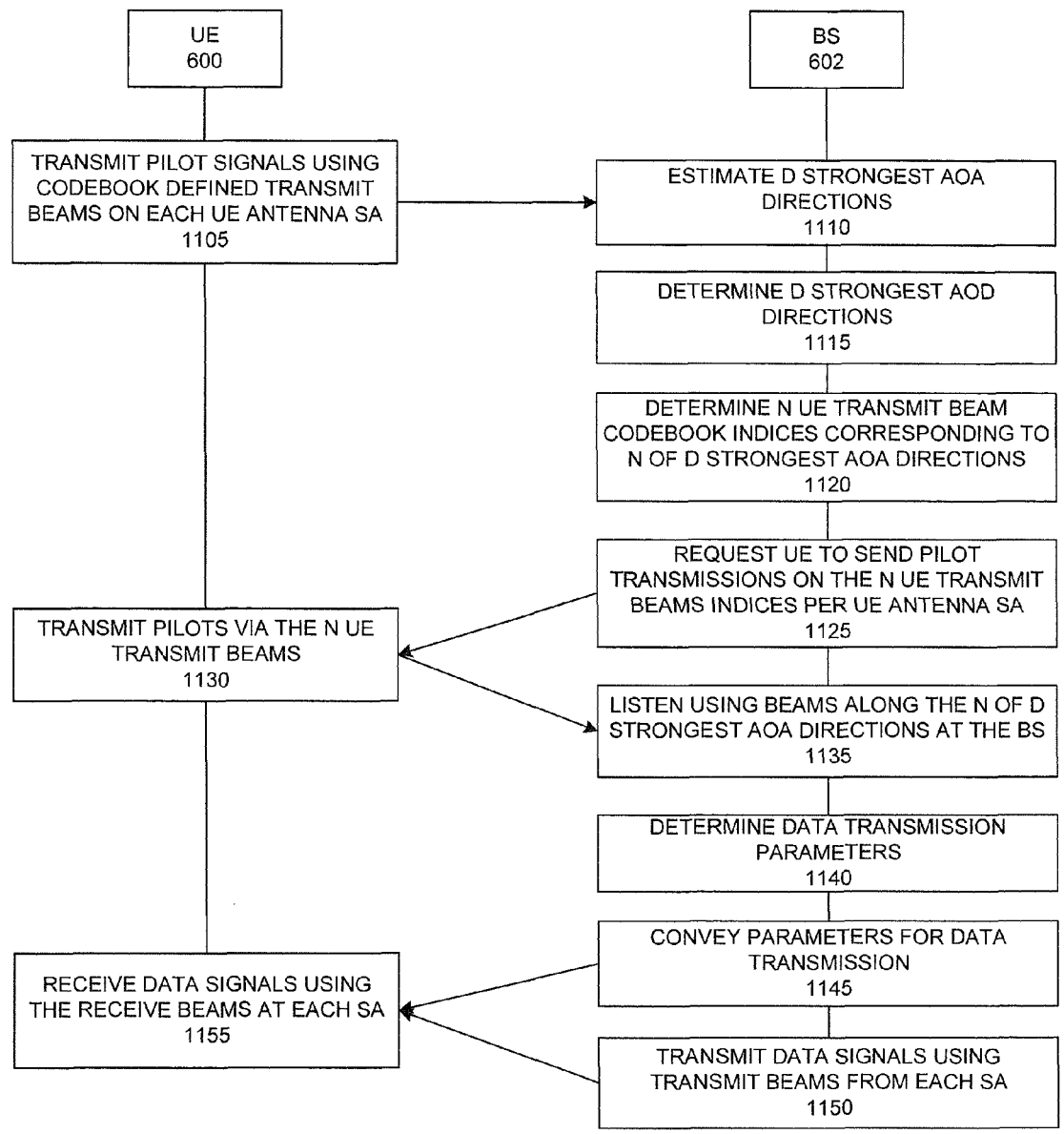
FIG. 11 illustrates a flowchart of a process for channel estimation in a wireless communication system including receivers and transmitters implementing an AoS architecture according to other embodiments of this disclosure.

FIG. 11 illustrates a process for channel estimation in a wireless communication system including receivers and transmitters implementing an AoS architecture according to other embodiments of this disclosure. For example, the process depicted in FIG. 11 may be performed by the UE 600 and the BS 602 in FIGS. 6 and 7.

The process begins with the UE 600 transmitting pilot signals using codebook defined transmit beams on each UE antenna SA (step 1105). For example, in step 1105, the UE may periodically perform exhaustive codebook pilot transmissions for the BS 602 to map out the channel conditions between the UE 600 and the BS 602.

Thereafter, the BS estimates D strongest signal AoA directions at the BS (step 1110). For example, in step 1110, the BS 602 may identify which receive signal paths produce the strongest received signals and/or where the stronger signal paths are present in the propagation channel between the UE 600 and the BS 602. These AoA directions may or may not correspond to the directions of the codebook defined beams.

The BS 602 may then determine D strongest AoD directions at the BS 602 (step 1115). For example, in step 1115, the BS 602 may use channel reciprocity principles to identify which directions are best or preferred for transmitted signals. This step may be optional. For example, the BS 602 may not need to derive AoD directions for the pilot scan if the BS 602 is simply receiving the signals in the pilot scan. Steps 1105 to 1115 may be performed periodically in the background.

Thereafter, the BS 602 determines N UE transmit beam codebook indices corresponding to N of D strongest AoA directions at the BS 602 (step 1120). For example, in step 1120, the BS 602 may determine which UE transmit beams (out of those in the UE transmit beam codebook) resulted in the D strongest AoA direction receptions at the BS 602. Based on the BS's knowledge of the indexing of the beams in the UE transmit beam codebook, the BS 602 may then determine the indices corresponding to the N preferred transmit beams the UE 600 should use during the pilot scan.

The BS 602 then requests the UE 600 to send pilot transmissions on the N UE transmit beams indices per UE antenna SA (step 1125). The number N may be set in advance and may be all of or a subset of the D direction identified above.

Thereafter, the UE 600 transmits pilots via the N UE transmit beams (step 1130). For example, in step 1130, the UE 600 may transmit the pilots for the pilot scan as depicted in FIG. 8. The UE 600 may successively transmit pilots on one or more OFDM symbols per UE transmit beam per BS receive beam per UE SA (e.g., a total of N*N* number of pilot signal transmissions per SA).

The BS 602 then listens using beams along the N of D strongest AoA directions at the BS (step 1135). For example, in step 1135, the BS 602 may listen to the pilots transmitted on each of the N UE transmit beams via each of the N BS receive beams in order to estimate the channel quality at each possible (e.g., UE SA and transmit beam and BS SA and receive beam) combination.

Thereafter, the BS 602 determines the data transmission parameters (step 1140). For example, in step 1140, the BS 602 may determine the codebook indices of the receive beams to be used at each UE SA, the transmit beam at each BS SA, the transmission rank, digital precoder (which may or may not be part of a codebook), and/or the MCS for the subsequent data transmissions.

The BS 602 then conveys the parameters for the forthcoming data transmission, as well as the receive beams to be used at each SA of the UE 600 (step 1145). For example, in step 1145, the BS 602 may send the indices of the beams for the UE to use at the UE's SAs, as well as other downlink transmission parameters, such as, for example, the transmission rank, digital precoder (which may or may not be part of a codebook), and/or the MCS for the subsequent data transmissions.

Thereafter, the BS 602 transmits data signals using the transmit beams from each SA (step 1150), and the UE 600 receives the data signals using the receive beams at each SA (step 1155) identified as discussed above. The process for channel estimation and data transmission parameter determination may occur periodically based on a set duration for using such determined parameters or may be triggered dynamically based on changing channel conditions, UE movement speed, or when data transmission performance declines below an acceptable level.

Although FIGS. 10 and 11 illustrate examples of processes for channel estimation, various changes could be made to FIGS. 10 and 11. For example, while shown as a series of steps, various steps in each figure could overlap, occur in parallel, occur in a different order, or occur multiple times. For example, certain steps may be performed in a different order, manner, by a different entity, or may be omitted. Embodiments may be implemented with some steps from FIG. 10 and other steps from FIG. 11. In other examples, the UE 600 and the BS 602 may use the same beam combinations for uplink transmission as determined for downlink transmission via the principles of channel reciprocity. In another example, the UE 600 and the BS 602 may switch roles and perform each other's roles in determining the uplink transmit and receive beams per SA.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A method for performing channel estimation, the method comprising:
    identifying a set of preferred base station (BS) receive beams for each of a plurality of BS antenna sub-arrays (SAs) based on periodic pilot transmissions from a user equipment (UE) transmitted using predefined UE transmit beams;
    transmitting a request for the UE to transmit pilot signals for the set of preferred BS receive beams;
    receiving the pilot signals using the set of preferred BS receive beams;
    performing channel estimation and determining data transmission parameters based on the received pilot signals, the data transmission parameters including at least one receive beam at each UE antenna SA to be used for data reception; and
    transmitting, to the UE, information for identifying the at least one receive beam at each UE antenna SA to be used for data reception.

2. The method of claim 1, further comprising transmitting, to the UE, data signals using at least one transmit beam from each BS antenna SA for reception by the UE on the at least one receive beam at each UE antenna SA, wherein the data transmission parameters determined based on the received pilot signals further include at least one receive beam at each BS antenna SA, followed by a respective re-identification of all such receive beams as transmit beams used for transmission of the data signals.

3. The method of claim 1, further comprising:
    estimating a set of strongest signal angle of arrival (AoA) directions based on the periodic pilot transmissions on the predefined transmit beams,
    wherein identifying the set of preferred BS receive beams comprises selecting the set of preferred BS receive beams as being along one or more of the strongest AoA directions.

4. The method of claim 1, wherein:
    identifying the set of preferred BS receive beams based on the periodic pilot transmissions on the predefined UE transmit beams comprises identifying a number of the preferred BS receive beams to use for data transmission parameter determination,
    transmitting the request for the UE to transmit the pilot signals comprises transmitting the number of the preferred BS receive beams, and
    the UE determines a set of UE transmit beams to use for transmission of the pilot signals.

5. The method of claim 1, further comprising:
    identifying a set of UE transmit beam indices corresponding to the preferred BS receive beams for each of a plurality of UE antenna SAs,
    wherein transmitting the request for the UE to transmit the pilot signals comprises transmitting the request for the UE to transmit the pilot signals on a set of UE transmit beams corresponding to the identified set of UE transmit beam indices.

6. The method of claim 1, wherein the information for identifying the at least one receive beam at each UE antenna SA to be used for data reception comprises information indicating the at least one receive beam at each UE antenna SA relative to a transmit order of beams used by the UE during transmission of the pilot signals.

7. The method of claim 1, wherein the information for identifying the at least one receive beam at each UE antenna SA to be used for data reception comprises predefined beam indices of the at least one receive beam at each UE antenna SA.

8. An apparatus for performing channel estimation, the apparatus comprising:
a transceiver comprising a plurality of base station (BS) antenna sub-arrays (SAs); and
processing circuitry configured to:
identify a set of preferred BS receive beams for each of the plurality of BS antenna SAs based on periodic pilot transmissions from a user equipment (UE) transmitted using predefined UE transmit beams,
transmit, via the transceiver, a request for the UE to transmit pilot signals for the set of preferred BS receive beams,
receive, via the transceiver, the pilot signals using the set of preferred BS receive beams,
perform channel estimation and determine data transmission parameters based on the received pilot signals, the data transmission parameters including at least one receive beam at each UE antenna SA to be used for data reception, and
transmit, via the transceiver, information to the UE for identifying the at least one receive beam at each UE antenna SA to be used for data reception.

9. The apparatus of claim 8, wherein:
the transceiver is configured to transmit, to the UE, data signals using at least one transmit beam from each BS antenna SA for reception by the UE on the at least one received beam at each UE antenna SA, and
the data transmission parameters determined based on the received pilot signals further include at least one receive beam at each BS antenna SA, followed by a respective re-identification of all such receive beams as transmit beams used for transmission of the data signals.

10. The apparatus of claim 8, wherein the processing circuitry is configured to:
estimate a set of strongest signal angle of arrival (AoA) directions based on the periodic pilot transmissions on the predefined transmit beams, and
select the set of preferred BS receive beams as being along one or more of the strongest AoA directions.

11. The apparatus of claim 8, wherein the processing circuitry is configured to:
identify a number of the preferred BS receive beams to use for data transmission parameter determination, and
transmit, via the transceiver, the number of the preferred BS receive beams in the request for the UE to transmit the pilot signals,
wherein the UE determines a set of UE transmit beams to use for transmission of the pilot signals.

12. The apparatus of claim 8, wherein the processing circuitry is configured to:
identify a set of UE transmit beam indices corresponding to the preferred BS receive beams for each of a plurality of UE antenna SAs,
transmit, via the transceiver, the request for the UE to transmit the pilot signals on a set of UE transmit beams corresponding to the identified set of UE transmit beam indices.

13. The apparatus of claim 8, wherein the information for identifying the at least one receive beam at each UE antenna SA to be used for data reception comprises information indicating the at least one receive beam at each UE antenna SA relative to transmit order of beams used by the UE during transmission of the pilot signals.

14. The apparatus of claim 8, wherein the information for identifying the at least one receive beam at each UE antenna SA receive beams to be used for data reception comprises predefined beam indices of the at least one receive beam at each UE antenna SA.

15. An apparatus in a user equipment (UE), the apparatus comprising:
a transceiver comprising a plurality of UE antenna sub-arrays (SAs), the transceiver configured to receive pilot signals from a base station (BS) transmitted using predefined BS transmit beams; and
processing circuitry configured to:
identify a set of strongest angle of arrival (AoA) directions based on the received pilot signals,
receive, via the transceiver, a request to use N number of beams for data transmission parameter determination, and
determine a set of N UE transmit beams along N of the set of strongest AoA directions,
wherein the transceiver is further configured to:
transmit pilot signals via each of the N UE transmit beams from each SA,
receive information for identifying at least one receive beam at each UE antenna SA to use for data reception, and
receive data from the BS using the at least one receive beam at each UE antenna SA.

16. The apparatus of claim 15, wherein the information for identifying the at least one receive beam at each UE antenna SA to use for data reception comprises information indicating the at least one receive beam at each UE antenna SA relative to a transmission order of the N UE transmit beams used during transmission of the pilot signals.

17. The apparatus of claim 15, wherein the transceiver is further configured to transmit the pilot signals, from each SA, via each of the N UE transmit beams N different times for estimation by the BS on N BS receive beams at each BS SA.

18. An apparatus in a user equipment (UE), the apparatus comprising:
a transceiver comprising a plurality of UE antenna sub-arrays (SAs), the transceiver configured to:
transmit first pilot signals to a base station (BS) using predefined UE transmit beams; and
receive a request including an indication of N number of UE transmit beam indices for transmission of second pilot signals,
transmit the second pilot signals using N UE transmit beams corresponding to the N number of UE transmit beam indices from each SA,
receive information for identifying at least one receive beam at each UE antenna SA to use for data reception, and
receive data from the BS using the at least one receive beam at each UE antenna SA.

19. The apparatus of claim 18, wherein the information for identifying the at least one receive beam at each UE antenna SA to use for data reception comprises predefined beam indices of the at least one receive beam at each UE antenna SA .

20. The apparatus of claim 18, wherein the transceiver is further configured to transmit the second pilot signals for each SA using N UE transmit beams N different times for estimation by the BS on N BS receive beams.

* * * * *